US008776222B2

(12) United States Patent
Lu

(10) Patent No.: US 8,776,222 B2
(45) Date of Patent: *Jul. 8, 2014

(54) MESSAGE SCREENING SYSTEM

(75) Inventor: Larry L. Lu, Great Falls, VA (US)

(73) Assignee: Facebook, Inc., Menlo Park, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/345,398

(22) Filed: Jan. 6, 2012

(65) Prior Publication Data

US 2012/0110104 A1 May 3, 2012

Related U.S. Application Data

(63) Continuation of application No. 11/555,431, filed on Nov. 1, 2006, now Pat. No. 8,099,780, which is a continuation of application No. 09/801,932, filed on Mar. 9, 2001, now Pat. No. 7,174,453.

(60) Provisional application No. 60/258,902, filed on Dec. 29, 2000.

(51) Int. Cl.
*H04L 29/06* (2006.01)
*G06Q 10/10* (2012.01)
*H04L 12/58* (2006.01)

(52) U.S. Cl.
CPC ............ *H04L 51/12* (2013.01); *H04L 12/5855* (2013.01); *H04L 12/585* (2013.01); *G06Q 10/107* (2013.01)
USPC .............................. 726/22; 715/205; 709/206

(58) Field of Classification Search
CPC ... H04L 51/12; H04L 12/5855; G06Q 10/107

USPC .............................. 726/22; 709/206; 715/205
See application file for complete search history.

(56) References Cited

U.S. PATENT DOCUMENTS

| | | | |
|---|---|---|---|
| 5,101,424 | A | 3/1992 | Clayton |
| 5,315,504 | A | 5/1994 | Lemble |
| 5,339,391 | A | 8/1994 | Wroblewski et al. |
| 5,479,600 | A | 12/1995 | Wroblewski et al. |
| 5,532,715 | A | 7/1996 | Bates et al. |
| 5,619,648 | A | 4/1997 | Canale et al. |
| 5,694,523 | A | 12/1997 | Wical |

(Continued)

FOREIGN PATENT DOCUMENTS

| | | |
|---|---|---|
| EP | 0375138 | 6/1990 |
| EP | 0827063 | 3/1998 |

(Continued)

OTHER PUBLICATIONS

Bjerkie, "E-mail: The Boss is watching", Apr. 1, 1993, Internet and Personal Computing, vol. 96, p. 14.*

(Continued)

*Primary Examiner* — Taghi Arani
*Assistant Examiner* — Gregory Lane
(74) *Attorney, Agent, or Firm* — Keller Jolley Preece

(57) ABSTRACT

A message screening system includes routing to a supervisory recipient an electronic message directed to an intended recipient. The supervisory recipient then is allowed to screen the electronic message by approving or rejecting the electronic message. The electronic message then is forwarded to the intended recipient if the electronic message is approved by the supervisory recipient.

20 Claims, 3 Drawing Sheets

(56) References Cited

U.S. PATENT DOCUMENTS

| | | | |
|---|---|---|---|
| 5,796,948 A | 8/1998 | Cohen | |
| 5,826,261 A | 10/1998 | Spencer | |
| 5,835,722 A | 11/1998 | Bradshaw et al. | |
| 5,877,759 A | 3/1999 | Bauer | |
| 5,878,219 A | 3/1999 | Vance, Jr. et al. | |
| 5,895,465 A | 4/1999 | Guha | |
| 5,913,214 A | 6/1999 | Madnick et al. | |
| 5,924,090 A | 7/1999 | Krellenstein | |
| 5,933,827 A | 8/1999 | Cole et al. | |
| 5,940,821 A | 8/1999 | Wical | |
| 5,982,369 A | 11/1999 | Sciammarella et al. | |
| 5,983,214 A | 11/1999 | Lang et al. | |
| 5,987,446 A | 11/1999 | Corey | |
| 5,987,611 A | 11/1999 | Freund | |
| 5,991,756 A | 11/1999 | Wu | |
| 5,999,932 A | 12/1999 | Paul | |
| 6,023,723 A * | 2/2000 | McCormick et al. | 709/206 |
| 6,026,429 A | 2/2000 | Jones et al. | |
| 6,038,610 A | 3/2000 | Belfiore et al. | |
| 6,055,540 A | 4/2000 | Snow et al. | |
| 6,055,572 A | 4/2000 | Saksena | |
| 6,065,056 A | 5/2000 | Bradshaw et al. | |
| 6,073,142 A * | 6/2000 | Geiger et al. | 715/205 |
| 6,076,100 A | 6/2000 | Cottrille et al. | |
| 6,078,866 A | 6/2000 | Buck et al. | |
| 6,081,805 A | 6/2000 | Guha | |
| 6,094,657 A | 7/2000 | Hailpern et al. | |
| 6,098,066 A | 8/2000 | Snow | |
| 6,108,651 A | 8/2000 | Guha | |
| 6,112,201 A | 8/2000 | Wical | |
| 6,112,227 A * | 8/2000 | Heiner | 709/203 |
| 6,125,353 A | 9/2000 | Yagasaki | |
| 6,128,739 A | 10/2000 | Fleming, III | |
| 6,145,004 A | 11/2000 | Walsh | |
| 6,167,450 A | 12/2000 | Angwin et al. | |
| 6,175,830 B1 | 1/2001 | Maynard | |
| 6,182,081 B1 | 1/2001 | Dietl et al. | |
| 6,199,102 B1 | 3/2001 | Cobb | |
| 6,266,664 B1 | 7/2001 | Russell-Falla et al. | |
| 6,275,820 B1 | 8/2001 | Navin-Chandra | |
| 6,278,993 B1 | 8/2001 | Kumar | |
| 6,321,224 B1 | 11/2001 | Beall et al. | |
| 6,327,590 B1 | 12/2001 | Chidlovskii | |
| 6,339,437 B1 | 1/2002 | Nielsen | |
| 6,339,784 B1 | 1/2002 | Morris et al. | |
| 6,356,899 B1 | 3/2002 | Chakrabarti et al. | |
| 6,370,527 B1 | 4/2002 | Singhal | |
| 6,385,602 B1 | 5/2002 | Tso et al. | |
| 6,393,464 B1 * | 5/2002 | Dieterman | 709/206 |
| 6,442,549 B1 | 8/2002 | Schneider | |
| 6,456,998 B1 | 9/2002 | Bui | |
| 6,460,034 B1 | 10/2002 | Wical | |
| 6,463,430 B1 | 10/2002 | Brady et al. | |
| 6,480,885 B1 | 11/2002 | Olivier | |
| 6,505,194 B1 | 1/2003 | Nikolovska et al. | |
| 6,519,639 B1 | 2/2003 | Glasser et al. | |
| 6,560,600 B1 | 5/2003 | Broder | |
| 6,571,256 B1 | 5/2003 | Dorian et al. | |
| 6,574,632 B2 | 6/2003 | Fox | |
| 6,601,061 B1 | 7/2003 | Holt | |
| 6,606,620 B1 | 8/2003 | Sundaresan et al. | |
| 6,606,657 B1 | 8/2003 | Zilberstein et al. | |
| 6,615,248 B1 | 9/2003 | Smith | |
| 6,631,244 B2 | 10/2003 | Suginaga | |
| 6,654,787 B1 | 11/2003 | Aronson et al. | |
| 6,701,310 B1 | 3/2004 | Sugiura et al. | |
| 6,704,428 B1 | 3/2004 | Wurtz et al. | |
| 6,704,729 B1 | 3/2004 | Klein | |
| 6,718,365 B1 | 4/2004 | Dutta | |
| 6,721,741 B1 | 4/2004 | Eyal et al. | |
| 6,732,157 B1 | 5/2004 | Gordon et al. | |
| 6,745,227 B1 | 6/2004 | Bates et al. | |
| 6,745,367 B1 | 6/2004 | Bates et al. | |
| 6,769,009 B1 | 7/2004 | Reisman | |
| 6,785,671 B1 | 8/2004 | Bailey | |
| 6,785,824 B1 | 8/2004 | Grassle | |
| 6,795,856 B1 | 9/2004 | Bunch | |
| 6,854,074 B2 | 2/2005 | McLellan et al. | |
| 6,859,807 B1 | 2/2005 | Knight | |
| 6,938,021 B2 | 8/2005 | Shear | |
| 6,950,989 B2 | 9/2005 | Rosenzweig et al. | |
| 6,957,229 B1 | 10/2005 | Dyor | |
| 6,983,379 B1 | 1/2006 | Spalink et al. | |
| 7,046,139 B2 | 5/2006 | Kuhn et al. | |
| 7,051,116 B1 | 5/2006 | Rodriguez-Val et al. | |
| 7,174,453 B2 | 2/2007 | Lu | |
| 7,194,536 B2 | 3/2007 | Fellenstein et al. | |
| 7,246,128 B2 | 7/2007 | Jordahl | |
| 7,424,676 B1 | 9/2008 | Carlson | |
| 7,640,336 B1 | 12/2009 | Lu | |
| 7,904,554 B1 | 3/2011 | Lu | |
| 8,099,780 B2 | 1/2012 | Lu | |
| 2001/0003828 A1 | 6/2001 | Peterson et al. | |
| 2001/0012286 A1 * | 8/2001 | Huna et al. | 370/352 |
| 2002/0049806 A1 | 4/2002 | Gatz et al. | |
| 2002/0049907 A1 | 4/2002 | Woods et al. | |
| 2002/0052919 A1 | 5/2002 | Morris et al. | |
| 2002/0083179 A1 | 6/2002 | Shaw et al. | |
| 2002/0091936 A1 | 7/2002 | Tema | |
| 2002/0095415 A1 | 7/2002 | Walker et al. | |
| 2002/0107950 A1 | 8/2002 | Lu | |
| 2002/0120866 A1 | 8/2002 | Mitchell et al. | |
| 2002/0129015 A1 | 9/2002 | Caudill et al. | |
| 2002/0165777 A1 | 11/2002 | Lotvin et al. | |
| 2002/0181703 A1 | 12/2002 | Logan et al. | |
| 2002/0184496 A1 | 12/2002 | Mitchell et al. | |
| 2003/0023736 A1 | 1/2003 | Abkemeier | |
| 2003/0061111 A1 | 3/2003 | Dutta et al. | |
| 2003/0105822 A1 | 6/2003 | Gusler et al. | |
| 2003/0110168 A1 | 6/2003 | Kester et al. | |
| 2003/0177111 A1 | 9/2003 | Egendorf | |
| 2003/0204741 A1 | 10/2003 | Schoen et al. | |
| 2004/0003071 A1 | 1/2004 | Mathew et al. | |
| 2004/0003279 A1 | 1/2004 | Beilinson et al. | |
| 2004/0006621 A1 | 1/2004 | Bellinson et al. | |
| 2004/0010720 A1 | 1/2004 | Singh et al. | |
| 2004/0019650 A1 * | 1/2004 | Auvenshine | 709/206 |
| 2004/0093384 A1 | 5/2004 | Shipp | |
| 2004/0111479 A1 | 6/2004 | Borden et al. | |
| 2004/0148347 A1 | 7/2004 | Appelman et al. | |
| 2004/0154022 A1 | 8/2004 | Boss et al. | |
| 2004/0177015 A1 | 9/2004 | Galai | |
| 2004/0181690 A1 | 9/2004 | Rothermel et al. | |
| 2004/0203363 A1 | 10/2004 | Carlton et al. | |
| 2004/0249938 A1 | 12/2004 | Bunch | |
| 2005/0004949 A1 | 1/2005 | Trepess et al. | |
| 2005/0044181 A1 | 2/2005 | Lee | |
| 2005/0050222 A1 | 3/2005 | Packer | |
| 2005/0055416 A1 | 3/2005 | Heikes et al. | |
| 2005/0055450 A1 | 3/2005 | Gang | |
| 2005/0076060 A1 | 4/2005 | Finn et al. | |
| 2005/0091385 A1 | 4/2005 | Nordstrom | |
| 2005/0102407 A1 | 5/2005 | Clapper | |
| 2005/0108227 A1 | 5/2005 | Russell-Falla et al. | |
| 2005/0144297 A1 | 6/2005 | Dahlstrom et al. | |
| 2005/0149622 A1 | 7/2005 | Kirkland et al. | |
| 2005/0160144 A1 | 7/2005 | Bhatia | |
| 2005/0210387 A1 | 9/2005 | Alagappan et al. | |
| 2005/0228881 A1 | 10/2005 | Reasor et al. | |
| 2005/0282530 A1 | 12/2005 | Raff | |
| 2006/0075358 A1 | 4/2006 | Ahokas | |
| 2006/0085419 A1 | 4/2006 | Rosen | |
| 2006/0127870 A1 | 6/2006 | Fields et al. | |
| 2006/0155764 A1 | 7/2006 | Tao | |
| 2006/0161668 A1 | 7/2006 | Mathew et al. | |
| 2006/0161669 A1 | 7/2006 | Mathew et al. | |
| 2006/0168186 A1 | 7/2006 | Mathew et al. | |
| 2006/0173792 A1 | 8/2006 | Glass | |
| 2006/0173793 A1 | 8/2006 | Glass | |
| 2006/0263757 A1 | 11/2006 | Bender | |
| 2007/0061869 A1 | 3/2007 | DeHaas | |
| 2007/0143281 A1 | 6/2007 | Smirin et al. | |
| 2007/0162507 A1 | 7/2007 | McGovern et al. | |
| 2008/0275820 A1 | 11/2008 | Joao et al. | |

(56) References Cited

U.S. PATENT DOCUMENTS

| | | | |
|---|---|---|---|
| 2011/0238478 | A1 | 9/2011 | Gottfurcht et al. |
| 2013/0018971 | A1 | 1/2013 | Lu |
| 2013/0173721 | A1 | 7/2013 | Lu |

FOREIGN PATENT DOCUMENTS

| | | |
|---|---|---|
| EP | 0918295 | 5/1999 |
| EP | 0945811 | 9/1999 |
| EP | 1045547 | 10/2000 |
| EP | 1079318 | 2/2001 |
| EP | 1209866 | 5/2002 |
| JP | 2000-357176 | 12/2000 |
| WO | WO 99/39286 | 8/1999 |
| WO | WO 00/26762 | 5/2000 |
| WO | WO 00/58894 | 10/2000 |
| WO | WO 00/68815 | 11/2000 |
| WO | WO 01/16806 | 3/2001 |
| WO | WO 01/27720 | 4/2001 |

OTHER PUBLICATIONS

U.S. Appl. No. 13/791,506, filed Mar. 8, 2013, Lu.
The Wall Street Journal Article, "Esniff Ferrets Out Misbehavior by 'Reading' E-Mail, Web Visits," Katherine Lange, interactive.wsj.com, Apr. 27, 2001:Tech Q&A.
The Early Report-The Early Show segment, "Big Brother in the Corner Office," Julie Chen, cbsnews.com/earlyshow/caught/techage/20001228e_sniff.shtml, Dec. 28, 2000: Tech Age.
"The eSniff Product Overview," eSniff: Define Your e-Boundaries, www.esniff.com/product_overview.html, May 15, 2001.
SpectorSoft Corporation, Industry Leading Spy Software Company Announces Instant Messaging Feature in Spector Professional Edition, Apr. 24, 2002.
SpectorSoft Corporation, SpectorSoft Corporation Ships Major Upgrade of eBlaster, Aug. 21, 2002.
Press release, SpectorSoft Corporation, SpectorSoft Announces New Version of Award Winning Spector Software, May 18, 2000.
Nigel Miller, Can an employer monitor its employees' E-mail?, Computer Audit Update, May 1997, pp. 30-31.
Notification of Transmittal of the International Search Report or the Declaration in PCT US01/48749, on Apr. 11, 2002.
"Guardian Setup Instructions" [online], America Online [retrieved Nov. 23, 2004]; retrieved from the Internet: http://challenevents.aol.com/guardian/images/print-instructions:gif.
"Guardian an e-mail report that shows parents what their children are doing online" [online], America Online [retrieved on Nov. 23, 2004]; retrieved from the Internet: http://challenevents.aol.com/guardian/.
"Parental Controls" [online], America Online [retrieved on Nov. 23, 2004]; retrieved from the Internet: http://www.aol.com/info/parentalcontrol.html/.
Ignite Software: Parent Tools Feature Set, "Parent Tools Features," http://www.parent-tools.com/features.htm, Ignite Software, pp. 1-3, as accessed on Dec. 10, 2003.
Parent Tools—The Ultimate in Monitoring an Controlling AIMe, "Parent Tools in AIM," http://www.parent-tools.com/screenshots.htm, pp. 1-4, as accessed on Dec. 10, 2003.
McMurray, Sandy, "Shield your children from unsuitable Internet content," http://www.microsoft.com/canada/home.internet&security/2.4.8_protectwithparentalcontrolshowtosafeguardyourcomputer.asp#, Microsoft Home Magazine, pp. 1-3, as accessed on Dec. 10, 2003.
"Instant Messaging is Everyone's Business," Yahoo Business Messenger, Yahoo! 2003.
"SurfControl Instant Message Filter," Instant Message Filter, SurfControl plc. 2003.
"Spammers Target Instant Message Users," http://www.bizreport.com/article.php?art_id=5507. Nov. 13, 2003, pp. 1-4.
Olsen, Stefanie, "Will instant messaging become instant spamming?," http://news.com.com/2100-1023-252765.html?legacy=cnet, Feb. 16, 2001, pp. 1-4.

"Protect Your Privacy," MSN Features, http://mesenger.msn.com/Feature/Privacy.aspx, as accessed on Dec. 2, 2003.
"Jabber" http://www.jabber.com/index.cgi?CONTENT_ID=9, as accessed on Dec. 4, 2003.
"Knock Settings—Servers Tab," http://www.knockmail.com/support/adserverset.html, pp. 1-2, as accessed on Dec. 4, 2003.
"Preview Pending Emails in KnockMail," http://www.knockmail.com/support/previewemail.html, pp. 1-2, as accessed on Dec. 4, 2003.
"Managing your Addresses in KnockMail," http://www.knockmail.com/support/manaddresses.html, pp. 1-2, as accessed on Dec. 4, 2003.
"Approved Database," http://www.knockmail.com/support/apdatabase.html, pp. 1, as accessed on Dec. 4, 2003.
"Pending Database for KnockKnock," http://www.knockmail.com/support/penddatabase.html, pp. 1, as accessed on Dec. 4, 2003.
"Denied Database for KnockKnock," http://www.knockmail.com/support/denydatbase.html, pp. 1, as accessed on Dec. 4, 2003.
"Email Server Control for KnockKnock," http://www.knockmail.com/support/emailservcont.html, pp. 1-2, as accessed on Dec. 4, 2003.
"Listserv Control for KnockKnock," http://www.knockmail.com/support/listservcont.html, pp. 1, as accessed on Dec. 4, 2003.
http://www.knockmail.com/support/newsettings.jpg, as accessed on Dec. 4, 2003.
"Using KnockKnock," reprinted from http://www.knockmail.com/support/using knock.html on Dec. 4, 2003.
Jim Hu, "AOL developing search engine," CNET.com-News—Entertainment & Media—AOL developing search engine, pp. 1-3 [online], (Jun. 21, 1999) [retrieved on Jul. 26, 2000]. Retrieved from the Internet: <URL : http://news.cnet.com/news/0-1005-200-343860.html>.
Ian Leicht, "Re: My spamblock; Was: Thwarting UCE address culling programs" [online]. Jan. 26, 1997. Retrieved from Internet newsgroup: <news.admin.net-abuse.email> [retrieved on Jul. 15, 2003], pp. 1-2.
"Development and Operation of the Next-Generation Rating/Filtering System on the Internet," (XP002219058). Retrieved from the Internet:<URL:http://www.nmda.or.jp/enc/rating2nd-en.html> on Oct. 30, 2002.
T. Negrino, "The MacWorld Web Searcher's Companion," MacWorld, PC World Communications, San Francisco, CA, US, vol. 17, No. 5, May 2000, pp. 76-82 (XP008019722).
"Knock Knock Settings," reprinted from http://www.knockmail.com/support/newsettings.jpg, as accessed on Dec. 4, 2003.
Sentry Remote: *Sentry Remote*, at: http://web.archive.org/web/20070629024905/www.sentryparentalcontrols.com/Content/Products/Remote.aspx, Jun. 2007.
Business Wire, Jul. 26, 2006, Bethpage, New York.
U.S. Appl. No. 09/801,932, Oct. 29, 2003, Office Action.
U.S. Appl. No. 09/801,932, Apr. 8, 2004, Office Action.
U.S. Appl. No. 09/801,932, Mar. 7, 2005, Office Action.
U.S. Appl. No. 09/801,932, Jan. 25, 2006, Office Action.
U.S. Appl. No. 09/801,932, Jul. 18, 2006, Notice of Allowance.
U.S. Appl. No. 09/801,932, Dec. 28, 2006, Notice of Allowance.
U.S. Appl. No. 10/330,561, Jun. 28, 2006, Office Action.
U.S. Appl. No. 10/330,561, Dec. 20, 2006, Notice of Allowance.
U.S. Appl. No. 10/330,561, May 4, 2007, Office Action.
U.S. Appl. No. 10/330,561, Nov. 16, 2007, Office Action.
U.S. Appl. No. 10/330,561, Aug. 20, 2008, Office Action.
U.S. Appl. No. 10/330,561, Mar. 19, 2009, Office Action.
U.S. Appl. No. 10/330,561, Aug. 24, 2009, Notice of Allowance.
U.S. Appl. No. 11/091,272, Jun. 18, 2008, Office Action.
U.S. Appl. No. 11/555,431, Jun. 10, 2010, Office Action.
U.S. Appl. No. 11/555,431, Nov. 19, 2010, Office Action.
U.S. Appl. No. 11/555,431, Sep. 20, 2011, Notice of Allowance.
U.S. Appl. No. 12/646,505, Sep. 13, 2010, Office Action.
U.S. Appl. No. 12/646,505, Nov. 24, 2010, Notice of Allowance.
U.S. Appl. No. 13/615,102, Jul. 3, 2013, Office Action.
U.S. Appl. No. 13/791,506, Nov. 8, 2013, Office Action.
U.S. Appl. No. 13/791,506, Apr. 8, 2014, Office Action.

* cited by examiner

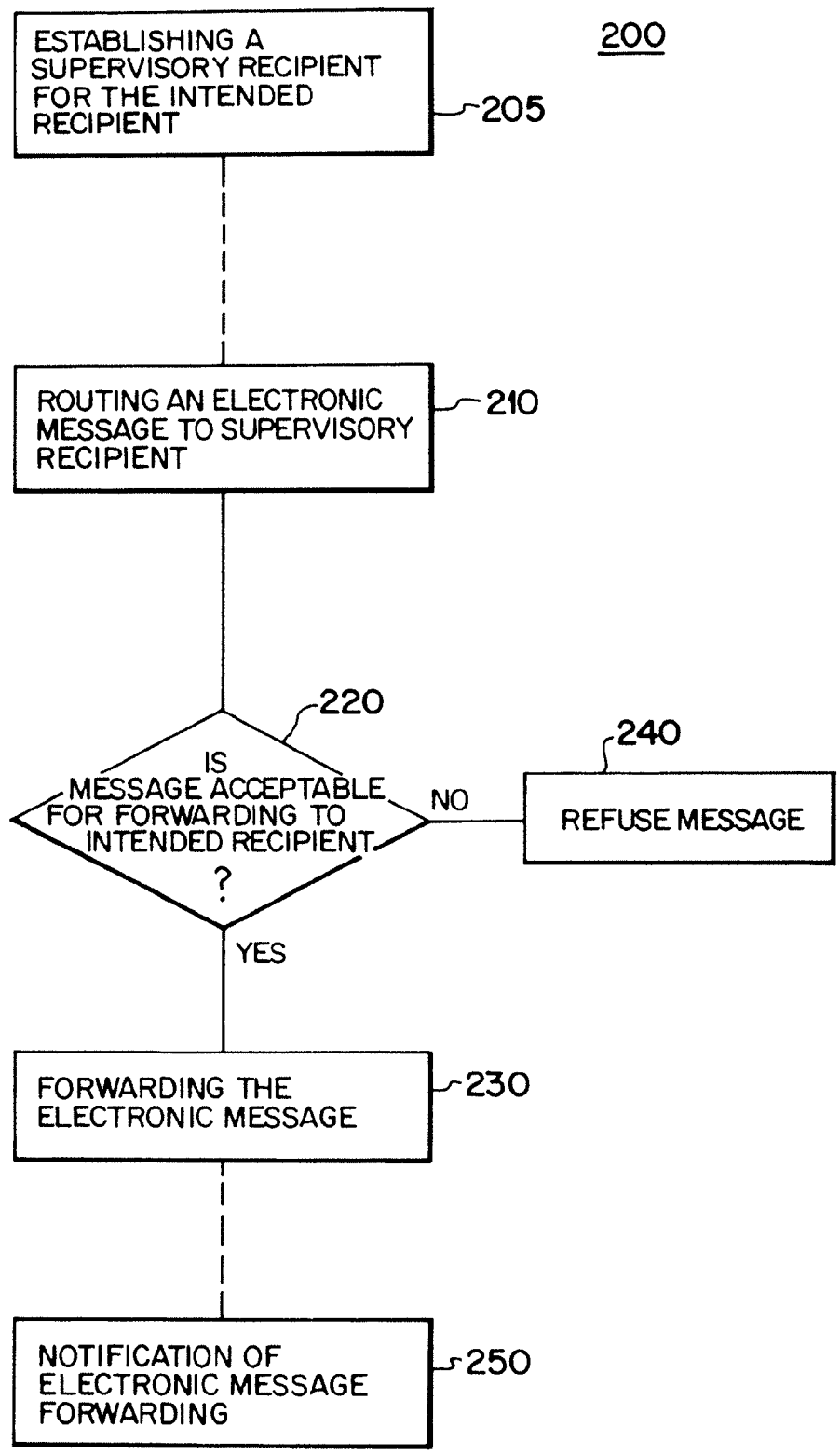

MESSAGE SCREENING SYSTEM

CROSS-REFERENCE TO RELATED APPLICATIONS

The present application is a continuation of U.S. patent application Ser. No. 11/555,431, filed Nov. 1, 2006, now allowed, which is a continuation of U.S. patent application Ser. No. 09/801,932, filed Mar. 9, 2001, now U.S. Pat. No. 7,174,453, which claims priority from U.S. Provisional Application No. 60/258,902, filed Dec. 29, 2000. The prior applications are incorporated herein by reference in their entirety.

TECHNICAL FIELD

This invention relates to screening electronic messages.

BACKGROUND

In some instances, parents and employers may want to supervise their children's and employees' Internet access to prevent improper use, such as receipt of inappropriate content or communications. This supervision may involve "eyes-on" supervision by parents or employers to prevent communication by or with undesirable elements. For instance, a parent or an employer may choose to physically prevent Internet access by the child or the employee until after the parent or the employer has reviewed received messages or to maintain "eyes-on" supervision while the child or the employee is online

SUMMARY

In one general aspect, electronic messages may be routed by routing an electronic message directed to an intended recipient to a supervisory recipient and enabling the electronic message to be screened by the supervisory recipient. Implementations may include one or more of the following features. For example, routing the electronic message may include notifying the intended recipient that the electronic message has been routed to the supervisory recipient. Routed electronic messages may include email, instant or chat room messages.

In some implementations, screening the electronic message may include allowing the supervisory recipient to approve or reject the electronic message, and forwarding the approved electronic message to the intended recipient. Screening the electronic message also may include comparing an electronic address of a sender of the electronic message to a sender list, and approving or rejecting the electronic message based on a result of the comparison. The sender list may include a list of approved senders to compare the electronic address of the sender to the list of approved senders. Alternatively, or additionally, the sender list may include a list of blocked senders to compare the electronic address of the sender to the list of blocked senders.

In some implementations, a supervisory recipient may be designated for an intended recipient. For example, the intended recipient may be a minor child and the supervisory recipient may be a guardian for the minor child. The intended recipient and the supervisory recipient may have related accounts within an electronic mail service. Additionally, the intended recipient and the supervisory recipient may have unique screen names comprising a single Internet service provider account. Alternatively, the intended recipient and the supervisory recipient may have unrelated accounts.

Implementations may include a method or process, an apparatus or system, or computer software on a computer medium. The details of one or more of the implementations are set forth in the accompanying drawings and the description below. Other features and advantages will be apparent from the description and drawings, and from the claims.

DESCRIPTION OF DRAWINGS

FIG. 2 is a flow chart of a method of message screening

Like reference symbols in the various drawings indicate like elements.

DETAILED DESCRIPTION

Figure 1A:
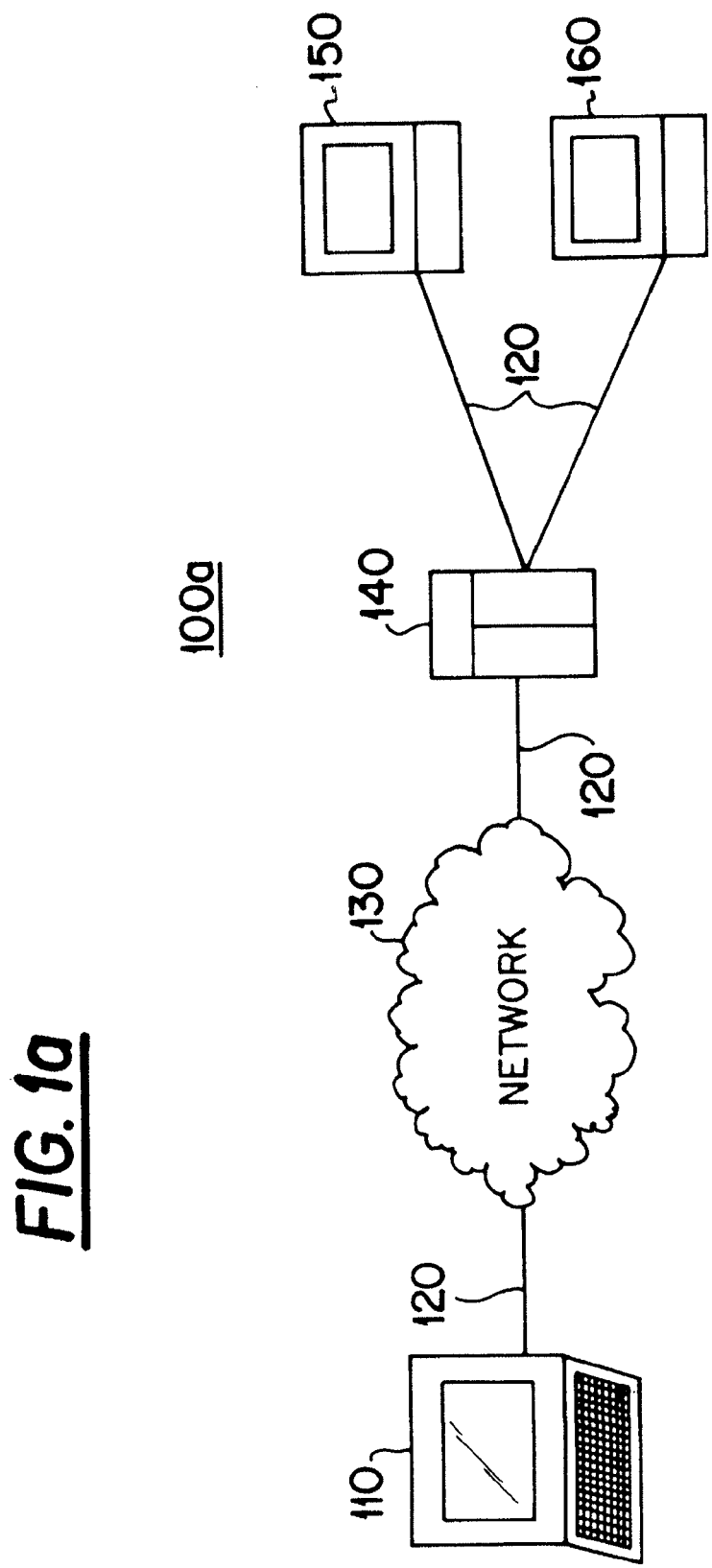
FIGS. 1a and 1b are schematic diagrams of a message screening system.

Referring to FIG. 1a, a message screening system 100a includes sender 110, communication links 120, delivery network 130, server 140, intended recipient 150, and supervisory recipient 160.

Figure 1B:
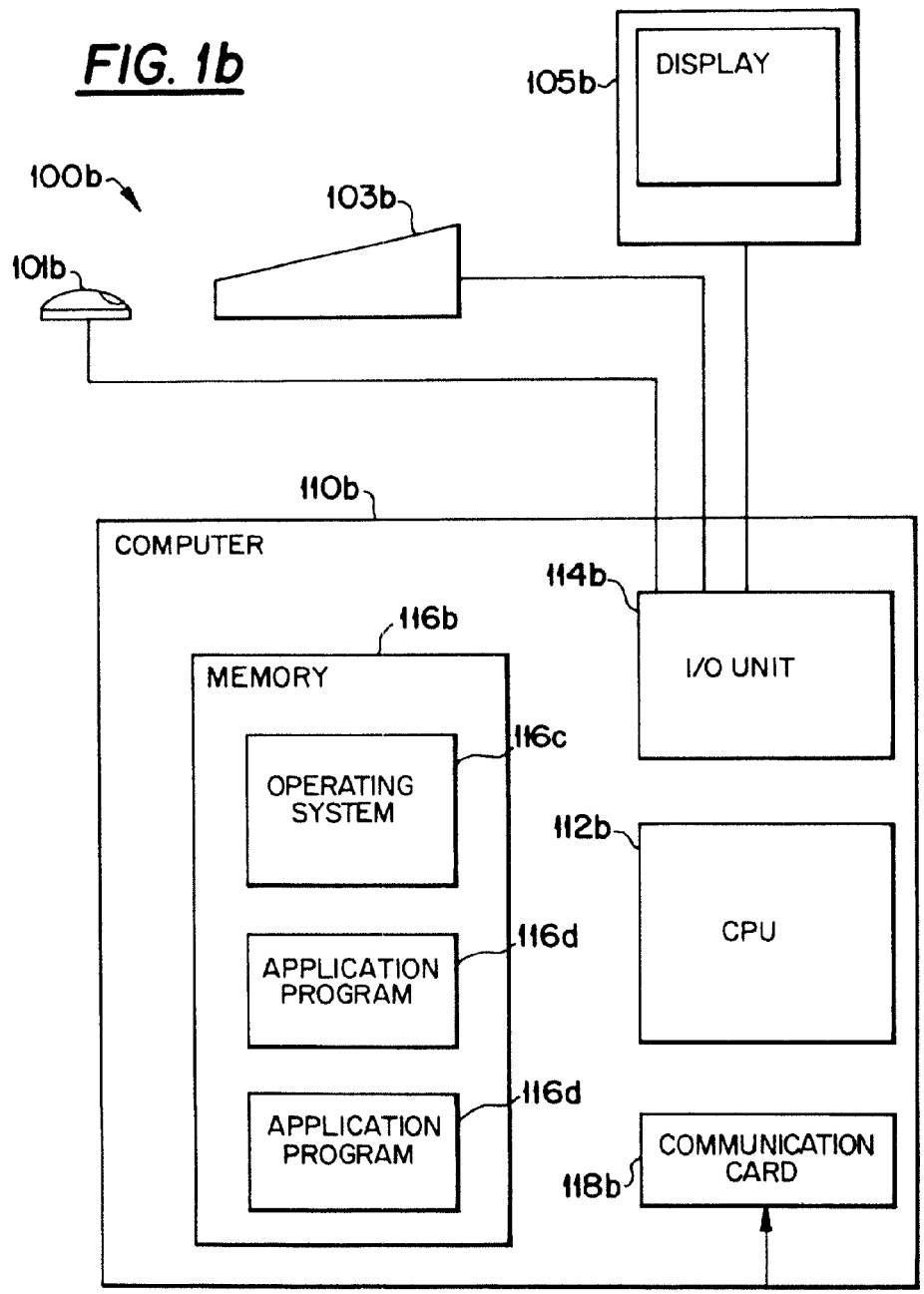

Sender 110 may be a computer programmed or configured to send an electronic message, such as hardware setup 100b described with reference to FIG. 1b. Hardware setup 100b may include various input/output (I/O) devices (e.g., mouse 101b, keyboard 103b, and display 105b) and a general purpose computer 110b having central processor unit (CPU) 112b, an I/O unit 114b, and memory 116b that stores data and various programs, such as an operating system 116c and one or more application programs 116d. Computer system 110b also typically includes some sort of communications card or device 118b (e.g., a modem or a network adapter) for exchanging data with a network.

Alternatively, sender 110 may be implemented by another type of machine or device capable of sending an electronic message. Examples of electronic messages include e-mail, chat room, private chat room, instant messaging, bulletin board postings, and other systems for transmitting text or graphics images to recipients. In other implementations, sender 110 may send a non-electronic message such as a letter, an audio or video message, or a light modulated message.

Sender 110 may be connected to delivery network 130 by communication link 120. Communication link 120 may include one or more communication pathways that enable communications through one or more delivery networks, such as wired, wireless, cable, or satellite communication pathways. Examples of delivery networks 130 may include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The Internet is a global network connecting millions of computers using a decentralized design.

Delivery network 130 may be connected by communication link 120 to message screening (MS) server 140, which is capable of handling message screening functions. AMS server 140 may include a computer. Alternatively, MS server 140 may include a multi-purpose device, or other devices capable of managing message screening functions. Message screening functions may include redirecting messages from an intended recipient to a supervisory recipient, concurrent with or instead of directing those messages to the intended recipient. The messages to be directed by delivery network 130 to the supervisory recipient may be filtered or otherwise identified based on predetermined criteria or in other ways.

MS server 140 may be connected by communication link 120 to intended and supervisory recipients 150, 160. Intended and supervisory recipients 150, 160 generally are capable of communicating electronic messages and information with the MS server 140 and each other. For example, intended and supervisory recipients 150, 160 may include personal computer systems or other electronic devices such as a pager, a personal digital assistant, or a wireless telephone for communicating electronic messages. Moreover, intended and supervisory recipients 150, 160 may include software stored on a computer system with different screen names and passwords enabling access to different accounts. In one implementation, intended recipient 150 includes software enabling access by a minor child, and supervisory recipient 160 includes software enabling access by the child's parent or guardian. In another implementation, intended recipient 150 includes software enabling access by an employee and supervisory recipient 160 includes software enabling access and/or supervision by an employer.

Referring to FIG. 2, a process 200 for message screening includes receiving an electronic message directed to an intended recipient and directing that electronic message to a supervisory recipient (step 210), enabling screening of the electronic message by the supervisory recipient (step 220), and forwarding an approved electronic message to the intended recipient (step 230). The method 200 for message screening also may include establishing a supervisory recipient for the intended recipient (step 205) and/or notifying the intended recipient (step 250) that one or more messages have been screened.

Establishing a supervisory recipient (step 205) may include, for example, storing the related electronic address of the supervisory recipient 160 for the intended recipient 150 in the memory or storage of MS server 140.

Receiving an electronic message (step 210) generally is performed by examining the header of the electronic message for an electronic address corresponding to intended recipient 150, determining whether the electronic address of intended recipient 150 corresponds to an intended recipient that is subject to supervisory screening, and routing the electronic message to supervisory recipient 160 if the address corresponds to an intended recipient subject to supervisory screening.

More specifically, using the electronic address of intended recipient 150 specified in the electronic message or otherwise obtained, MS server 140 determines the electronic address of supervisory recipient 160 by, for example, referring to a database or lookup table. MS server 140 then may route the electronic message automatically to an appropriate supervisory recipient 160 corresponding to intended recipient 150.

The electronic message may be routed to supervisory recipient 160 in addition to intended recipient 150, or it may be routed to supervisory recipient 160 in lieu of intended recipient 150. In one implementation, the message screening system may be configured to enable review by supervisory recipient 160 without preventing or delaying receipt by intended recipient 150. This can be performed by, for example, sending the electronic message concurrently to both intended recipient 150 and supervisory recipient 160. Alternatively, the supervisory recipient 160 may be given a certain time period to screen and approve an electronic message, after which a default condition may be established to automatically forward the electronic message to the intended recipient 150 or to permanently delete the electronic message. In any case, receipt of the message by supervisory recipient 160 may be performed with or without notice to intended recipient 150. Furthermore, an electronic message may be directed to one or more supervisory recipients 160.

Enabling screening of the electronic message by the supervisory recipient (step 220) may include reviewing the electronic message. Supervisory recipient 160 may be provided with a viewing screen having one or more control panels that allow supervisory recipient to approve or reject the electronic message for receipt by intended recipient 150.

The message screening system may be configured to automatically screen an electronic message. For example, lists of approved or blocked senders 110 may be stored at supervisory recipient 160, or otherwise, to enable automatic screening of predesignated message types or sender identifications. In one implementation, during the screening process, the sender 110 may be added to the lists of approved or blocked senders by the supervisory recipient 160. In another implementation, the MS server 140 may compare the electronic address of sender 110 to the list of approved or blocked senders 110 and, based on the comparison, either forward the message, reject the message, or allow supervisory recipient 160 to screen this message of senders 110 personally, or otherwise. Approval may include a manual procedure performed by supervisory recipient 160 such as entering a command or pressing a key. Approval also may be a default condition that is presumed to exist after a certain time period of inaction by supervisory recipient 160 after receiving the electronic message. In general, MS server 140 generally forwards the electronic message to intended recipient 150.

Forwarding an approved electronic message to the intended recipient (step 230) generally includes automatically routing the electronic message to the intended recipient if the message is deemed acceptable for forwarding (in step 220). For example, sender 110 may be included on a list of approved senders. Conversely, if the message is not deemed acceptable for forwarding, the message may be refused (step 240). For example, the message may be refused by deletion of the message. In another implementation, the sender may receive or access a message indicating that the electronic message sent to intended recipient 150 was refused.

Refusal may occur after sender 110 is added to a list of senders whose messages are automatically refused. In yet another implementation, if a threshold number of electronic messages from a sender 110 are refused, the sender may be added to a list of senders to be refused or blocked and all further electronic messages from that sender 110 may be automatically refused or blocked, as appropriate.

Referring again to FIG. 2, message screening 200 also may include notifying the intended recipient that the electronic message has been routed to the supervisory recipient (step 250). The notification may include, for example, an electronic message or a pop-up screen sent by MS server 140 that alerts intended recipient 150 that the electronic message has been routed to supervisory recipient 160.

In the examples described above, supervisory recipient 160 and intended recipient 150 may have related accounts, they may have unique screen names as part of a shared Internet service provider (ISP) account, or they may have unrelated accounts.

A number of implementations of the message screening system have been described. Nevertheless, it will be understood that various modifications may be made without departing from the spirit and scope of the message screening system. Accordingly, other implementations are within the scope of the following claims.

What is claimed is:

1. A method comprising:
   establishing a supervisory relationship between a supervisory person and at least one recipient;
   receiving an electronic message transmitted across a network from a sender device and directed to an electronic message address of the at least one recipient;
   determining, using at least one processor, an electronic message address of the supervisory person based on the electronic message address of the at least one recipient;
   delivering the electronic message to the determined electronic message address of the supervisory person before delivering the electronic message to the electronic message address of the at least one recipient;
   enabling the supervisory person to review the electronic message after the electronic message has been delivered to the electronic message address of the supervisory person; and
   delivering the electronic message to the electronic message address of the at least one recipient when a review condition is met.

2. The method of claim 1, further comprising:
   notifying the recipient that the electronic message has been sent to the supervisory person.

3. The method of claim 1, wherein the review condition is met when the supervisory person approves the electronic message.

4. The method of claim 1, wherein the review condition is met when a period of time passes without the supervisory person rejecting the electronic message.

5. The method of claim 1, wherein the electronic message is an e-mail.

6. The method of claim 1, wherein the electronic message is a chat room message.

7. The method of claim 1, wherein the electronic message is an instant message.

8. A system comprising:
   at least one processing device; and a storage device that stores instructions for causing the at least one processing device to:
   receive an electronic message transmitted across a network from a sender device and directed to an electronic message address of at least one recipient;
   determine an electronic message address of a supervisory person based the electronic message address of the at least one recipient;
   deliver the electronic message to the determined electronic message address of the supervisory person before delivering the electronic message to the electronic message address of the at least one recipient;
   enable the supervisory person to review the electronic message after the electronic message has been delivered to the electronic message address of the supervisory person; and
   deliver the electronic message to the electronic message address of the at least one recipient when a review condition is met.

9. The system of claim 8, wherein the storage device further stores instructions that cause the at least one processing device to notify the recipient that the electronic message has been sent to the supervisory person.

10. The system of claim 8, wherein the review condition is met when the supervisory person approves the electronic message.

11. The system of claim 8, wherein the review condition is met when a period of time passes without the supervisory person rejecting the electronic message.

12. The system of claim 8, wherein the electronic message is an e-mail.

13. The system of claim 8, wherein the electronic message is a chat room message.

14. The system of claim 8, wherein the electronic message is an instant message.

15. A non-transitory computer-readable medium that contains instructions that cause at least one processor to perform the following:
   receive an electronic message transmitted across a network from a sender device and directed to an electronic message address of at least one recipient;
   determine an electronic message address of a supervisory person based on the electronic message address of the at least one recipient;
   deliver the electronic message to the determined electronic message address of the supervisory person before delivering the electronic message to the electronic message address of the at least one recipient;
   enable the supervisory person to review the electronic message after the electronic message has been delivered to the electronic message address of the supervisory person; and
   deliver the electronic message to the electronic message address of the at least one recipient when a review condition is met.

16. The non-transitory computer-readable medium of claim 15, wherein the storage device further stores instructions that cause the at least one processor to notify the recipient that the electronic message has been sent to the supervisory person.

17. The non-transitory computer-readable medium of claim 15, wherein the review condition is met when the supervisory person approves the electronic message.

18. The non-transitory computer-readable medium of claim 15, wherein the review condition is met when a period of time passes without the supervisory person rejecting the electronic message.

19. The non-transitory computer-readable medium of claim 15, wherein the electronic message is an e-mail.

20. The non-transitory computer-readable medium of claim 15, wherein the electronic message is a chat room message.

* * * * *